United States Patent
Li et al.

(10) Patent No.: US 10,578,767 B2
(45) Date of Patent: Mar. 3, 2020

(54) CONDITIONAL PROCESS-AIDED MULTIPLE-POINTS STATISTICS MODELING

(71) Applicants: Hongmei Li, Spring, TX (US); Tao Sun, Missouri City, TX (US)

(72) Inventors: Hongmei Li, Spring, TX (US); Tao Sun, Missouri City, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 714 days.

(21) Appl. No.: 14/421,372

(22) PCT Filed: Aug. 23, 2013

(86) PCT No.: PCT/US2013/056438
§ 371 (c)(1),
(2) Date: Feb. 12, 2015

(87) PCT Pub. No.: WO2014/051904
PCT Pub. Date: Apr. 3, 2014

(65) Prior Publication Data
US 2015/0219793 A1 Aug. 6, 2015

Related U.S. Application Data

(60) Provisional application No. 61/705,981, filed on Sep. 26, 2012.

(51) Int. Cl.
| | |
|---|---|
| *G01V 99/00* | (2009.01) |
| *G06F 17/18* | (2006.01) |
| *G01V 1/30* | (2006.01) |

(52) U.S. Cl.
CPC ............ *G01V 99/005* (2013.01); *G06F 17/18* (2013.01); *G01V 1/30* (2013.01);
(Continued)

(58) Field of Classification Search
CPC .................................................... G01V 99/005
See application file for complete search history.

(56) References Cited

U.S. PATENT DOCUMENTS

| | | |
|---|---|---|
| 5,844,799 A | 12/1998 | Joseph et al. |
| 5,995,906 A | 11/1999 | Doyen et al. |

(Continued)

FOREIGN PATENT DOCUMENTS

WO   2009/138290   11/2009

OTHER PUBLICATIONS

Michael, H, et al., (2010), "Combining geologic-process models and geostatistics for conditional simulation of 3-D subsurface heterogeneity", *Water Resources Research*, vol. 46, pp. 1-20.

(Continued)

*Primary Examiner* — Akash Saxena
(74) *Attorney, Agent, or Firm* — ExxonMobil Upstream Research Company—Law Department

(57) ABSTRACT

A method of simulating a hydrocarbon reservoir is disclosed. A process-based model is generated that mimics a depositional process of the reservoir. The process-based model is analyzed to extract statistics of geometries of a body that forms part of the reservoir, and depositional rules of the body. An object-based modeling method is applied to construct multiple unconditional geologic models of the body using the statistics and the depositional rules. Training images are constructed using the multiple unconditional geologic models. Well data and gross thickness data are assigned into a simulation grid. A single multiple-point geostatistical simulation is performed using the training images. A three-dimensional (3D) reservoir model is constructed using results of the multiple-point geostatistical simulation.

11 Claims, 12 Drawing Sheets

(52) U.S. Cl.
CPC .. *G01V 2210/661* (2013.01); *G01V 2210/665* (2013.01); *G06F 2217/16* (2013.01)

(56) References Cited

U.S. PATENT DOCUMENTS

| | | | |
|---|---|---|---|
| 6,070,125 | A | 5/2000 | Murphy et al. |
| 6,138,075 | A * | 10/2000 | Yost .......... G01V 1/32 702/14 |
| 6,246,963 | B1 | 6/2001 | Cross et al. |
| 6,674,432 | B2 | 1/2004 | Kennon et al. |
| 6,754,588 | B2 | 6/2004 | Cross et al. |
| 6,941,255 | B2 | 9/2005 | Kennon et al. |
| 7,006,951 | B2 | 2/2006 | Pond, Jr. et al. |
| 7,027,964 | B2 | 4/2006 | Kennon |
| 7,043,367 | B2 | 5/2006 | Granjeon |
| 7,043,413 | B2 | 5/2006 | Ward et al. |
| 7,062,383 | B2 | 6/2006 | Deffenbaugh et al. |
| 7,079,953 | B2 | 7/2006 | Thorne et al. |
| 7,117,091 | B2 | 10/2006 | Masson et al. |
| 7,123,258 | B2 | 10/2006 | Deny et al. |
| 7,149,671 | B2 | 12/2006 | Lim et al. |
| 7,260,508 | B2 | 8/2007 | Lim et al. |
| 7,292,241 | B2 | 11/2007 | Thore et al. |
| 7,337,069 | B2 | 2/2008 | Masson et al. |
| 7,340,385 | B2 | 3/2008 | James |
| 7,363,158 | B2 | 4/2008 | Stelting et al. |
| 7,369,973 | B2 | 5/2008 | Kennon et al. |
| 7,392,136 | B2 | 6/2008 | Salles et al. |
| 7,433,785 | B2 | 10/2008 | Deffenbaugh et al. |
| 7,516,055 | B2 | 4/2009 | Strebelle |
| 7,526,418 | B2 * | 4/2009 | Pita .......... E21B 49/00 702/12 |
| 7,558,708 | B2 | 7/2009 | Ravalec-Dupin et al. |
| 7,617,082 | B2 | 11/2009 | Childs et al. |
| 7,630,517 | B2 | 12/2009 | Mirowski et al. |
| 7,706,981 | B2 | 4/2010 | Wilkinson et al. |
| 7,742,875 | B2 | 6/2010 | Li et al. |
| 7,904,248 | B2 | 3/2011 | Li et al. |
| 7,925,481 | B2 | 4/2011 | Van Wagoner et al. |
| 8,010,294 | B2 | 8/2011 | Dorn et al. |
| 8,117,019 | B2 | 2/2012 | Sun et al. |
| 8,150,669 | B2 | 4/2012 | Cacas et al. |
| 8,311,779 | B2 | 11/2012 | Pedersen et al. |
| 8,326,542 | B2 | 12/2012 | Chevion et al. |
| 8,355,898 | B2 | 1/2013 | Pyrcz et al. |
| 8,370,121 | B2 | 2/2013 | Sun et al. |
| 8,504,300 | B2 | 9/2013 | Dorn et al. |
| 8,612,194 | B2 | 12/2013 | Horne et al. |
| 8,682,624 | B2 | 3/2014 | Mariethoz et al. |
| 8,776,895 | B2 | 7/2014 | Li et al. |
| 8,825,461 | B2 | 9/2014 | Sun et al. |
| 2006/0041409 | A1 * | 2/2006 | Strebelle .......... G01V 1/30 703/10 |
| 2006/0041410 | A1 * | 2/2006 | Strebelle .......... G01V 1/30 703/10 |
| 2007/0014435 | A1 * | 1/2007 | Mirowski .......... G01V 11/00 382/109 |
| 2007/0276604 | A1 | 11/2007 | Williams et al. |
| 2008/0133194 | A1 * | 6/2008 | Klumpen .......... E21B 47/00 703/10 |
| 2008/0195319 | A1 * | 8/2008 | Wilkinson .......... E21B 49/00 702/6 |
| 2009/0262603 | A1 * | 10/2009 | Hurley .......... G01V 11/00 367/86 |
| 2009/0312995 | A1 * | 12/2009 | Pyrcz .......... G01V 11/00 703/10 |
| 2011/0054869 | A1 | 3/2011 | Li et al. |
| 2011/0240310 | A1 * | 10/2011 | Sun .......... G01V 99/00 166/369 |
| 2011/0251833 | A1 * | 10/2011 | Mariethoz .......... G01V 11/00 703/2 |
| 2013/0054201 | A1 * | 2/2013 | Posamentier .......... G01V 99/005 703/2 |
| 2014/0365193 | A1 * | 12/2014 | Biegert .......... G01V 3/081 703/10 |
| 2016/0103245 | A1 * | 4/2016 | Pyrcz .......... G01V 99/005 703/2 |

OTHER PUBLICATIONS

Pyrcz, M.J., et al., (2005), "Stochastic Surface-Based Modeling of Turbidite Lobes", *AAAPG Bulletin*, V. 89, No. 2, pp. 177-191.

YanShu, Y., et al. (2009), "A Reservoir Skeleton-Based Multiple Point Geostatistics Method", *Science in China Services D: Earth Sciences*, pp. 171-178.

Bertoncello (2011) "Conditioning Surface-Based Models to Well and Thickness Data", A Dissertation Submitted to the Department of Energy Resources Engineering and the Committee on Graduate Studies of Stanford University, pp. 1-162.

\* cited by examiner

CONDITIONAL PROCESS-AIDED MULTIPLE-POINTS STATISTICS MODELING

CROSS-REFERENCE TO RELATED APPLICATION

This application is the National Stage entry under 35 U.S.C. 371 of PCT Application No. PCT/US2013/056438, that published as International Publication No. 2014/051904 and was filed on 23 Aug. 2013, which claims the benefit of U.S. Provisional Patent Application 61/705,981 filed Sep. 26, 2012 entitled CONDITIONAL PROCESS-AIDED MULTIPLE-POINTS STATISTICS MODELING, each of which is incorporated herein by reference, in its entirety, for all purposes.

FIELD OF THE INVENTION

The present techniques relate to the field of geologic modeling, and more particularly, to a computer-based system that constructs numerical models containing thin flow barriers associated with complex depositional surfaces.

BACKGROUND

A geologic model is a computer-based representation of a region of the earth subsurface, such as a petroleum reservoir. A geologic model commonly consists of a 3-D geocellular grid that is composed of contiguous 3-D cells, to which properties such as lithology, porosity, permeability or water saturation are assigned using various algorithms, e.g., geostatistical algorithms. The model can be used for many purposes, but is most commonly used as an input to computer programs that simulate the movement of fluids within the subsurface region. These programs are used to predict, for example, hydrocarbon production rates and volumes from a petroleum reservoir over time.

When sedimentary deposits are constructed by discrete elements/objects such as channels and lobes, they often form a characteristic depositional architecture that controls the three dimensional (3D) structure of the strata. This characteristic depositional architecture is called a stacking pattern. For example, a pro-gradational stacking pattern describes objects such as lobes stacking in a forward (paleo-flow) direction with little lateral movement. When flow barriers such as shale drape are deposited along the channel or lobe bounding surfaces, the proper representation of the spatial arrangement of these discrete objects or the stacking pattern is important because they control the flow barrier distribution and hence have significant effect on the movement of fluids in the reservoir. Current technology is not able to construct geologic models that precisely represent the interpreted or conceived depositional stacking pattern while at the same time being efficiently conditioned to the available data. This problem can be very costly if the model-based predictions are used as a basis for making high-expense business decisions, such as decisions related to drilling and completing wells, and to constructing surface facilities to handle produced hydrocarbons.

Pyrcz, et al. (2005) describes a surface-based method for constructing geologic models of reservoirs by reproducing the geometries and stacking patterns of flow-event deposits in turbidite lobes. The individual deposits are defined by stochastically modeling their bounding surfaces, and rules are established to constrain how the individual deposits stack within the model. The method of Pyrcz et al. (2005) is a stochastic method that has similarity to object-based algorithms, thus likely has similar limitations on data conditioning.

Michael et al. (2009) proposed a methodology that incorporates multiple simulation techniques to produce a model that mimics the architecture of the process-based model and is conditioned to well data only. First, the geologic features of grain size, or facies, and distributions simulated by a process-based model are analyzed, and statistics of feature geometry are extracted. The statistics are used to generate multiple realizations of reduced-dimensional features using an object-based technique. These realizations are used as multiple alternative training images in multiple-point geostatistical simulation (MPS), which is conditioned to well data. Successive realizations of individual strata/objects are generated in depositional order, each dependent on previously-simulated geometry, and stacked to produce a three-dimensional facies model that mimics the architecture of the process-based model. In the approach presented by Michael et al. (2009), MPS simulation is applied to sequentially simulate individual objects, not the whole stacked package. This pixel-based approach is flexible for conditioning individual well data, but is difficult in constraining a gross thickness map, such as seismic-derived gross thickness maps or zone thickness maps.

SUMMARY

According to disclosed methodologies and techniques, a method of simulating a hydrocarbon reservoir is disclosed. A process-based model is generated that mimics a depositional process of the reservoir. The process-based model is analyzed to extract statistics of geometries of a body that forms part of the reservoir, and depositional rules of the body. An object-based modeling method is applied to construct multiple unconditional geologic models of the body using the statistics and the depositional rules. Training images are constructed using the multiple unconditional geologic models. Well data and gross thickness data are assigned into a simulation grid. A single multiple-point geostatistical simulation is performed using the training images. A three-dimensional (3D) reservoir model is constructed using results of the multiple-point geostatistical simulation.

In another aspect, a method of simulating a hydrocarbon reservoir is disclosed. An object-based modeling method is applied to construct multiple unconditional geologic models of a depositional or sedimentary body in the hydrocarbon reservoir using statistics and depositional rules governing a depositional process in the hydrocarbon reservoir. Training images are constructed using the multiple unconditional geologic models. A single multiple-point geostatistical simulation is performed using the training images. A three-dimensional (3D) reservoir model is constructed using results of the multiple-point geostatistical simulation.

In another aspect, a system for simulating a hydrocarbon reservoir is provided. The system includes a processor and a tangible, machine-readable storage medium that stores machine-readable instructions for execution by the processor. The machine-readable instructions include: code for generating a process-based model that mimics a depositional process of the hydrocarbon reservoir, code for analyzing the process-based model to extract statistics of geometries of a depositional or sedimentary body that forms part of the hydrocarbon reservoir, and depositional rules of the depositional or sedimentary body; code for applying an object-based modeling method to construct multiple unconditional geologic models of the depositional or sedimentary body using the statistics and the depositional rules; code for constructing training images using the multiple unconditional geologic models; code for assigning well data and gross thickness data into a simulation grid; code for performing a single multiple-point geostatistical simulation using the training images, and code for constructing a three-dimensional (3D) model using results of the multiple-point geostatistical simulation.

In yet another aspect, a computer program product is having computer executable logic recorded on a tangible, machine readable medium is provided. The computer program product when executed simulates a hydrocarbon reservoir. The computer program product includes: code for generating a process-based model that mimics a depositional process of the hydrocarbon reservoir; code for analyzing the process-based model to extract statistics of geometries of a depositional or sedimentary body that forms part of the hydrocarbon reservoir, and depositional rules of the depositional or sedimentary body; code for applying an object-based modeling method to construct multiple unconditional geologic models of the depositional or sedimentary body using the statistics and the depositional rules; code for constructing training images using the multiple unconditional geologic models; code for assigning well data and gross thickness data into a simulation grid; code for performing a single multiple-point geostatistical simulation using the training images; and code for constructing a three-dimensional (3D) model using results of the multiple-point geostatistical simulation.

According to still another aspect, a method is provided for producing hydrocarbons from a hydrocarbon reservoir. A process-based model is generated that mimics a depositional process of the hydrocarbon reservoir. The process-based model is analyzed to extract a) statistics of geometries of a depositional or sedimentary body that forms part of the hydrocarbon reservoir, and b) depositional rules of the depositional or sedimentary body. An object-based modeling method is applied to construct multiple unconditional geologic models of the depositional or sedimentary body using the statistics and the depositional rules. Training images are constructed using the multiple unconditional geologic models. Well data and gross thickness data are assigned into a simulation grid. A single multiple-point geostatistical simulation is performed using the training images. A three-dimensional (3D) reservoir model is constructed using results of the multiple-point geostatistical simulation. Hydrocarbons are produced from the subsurface hydrocarbon reservoir using the three-dimensional reservoir model.

BRIEF DESCRIPTION OF THE DRAWINGS

Advantages of the present techniques may become apparent upon reviewing the following detailed description and the accompanying drawings in which.

DETAILED DESCRIPTION

Figure 1:
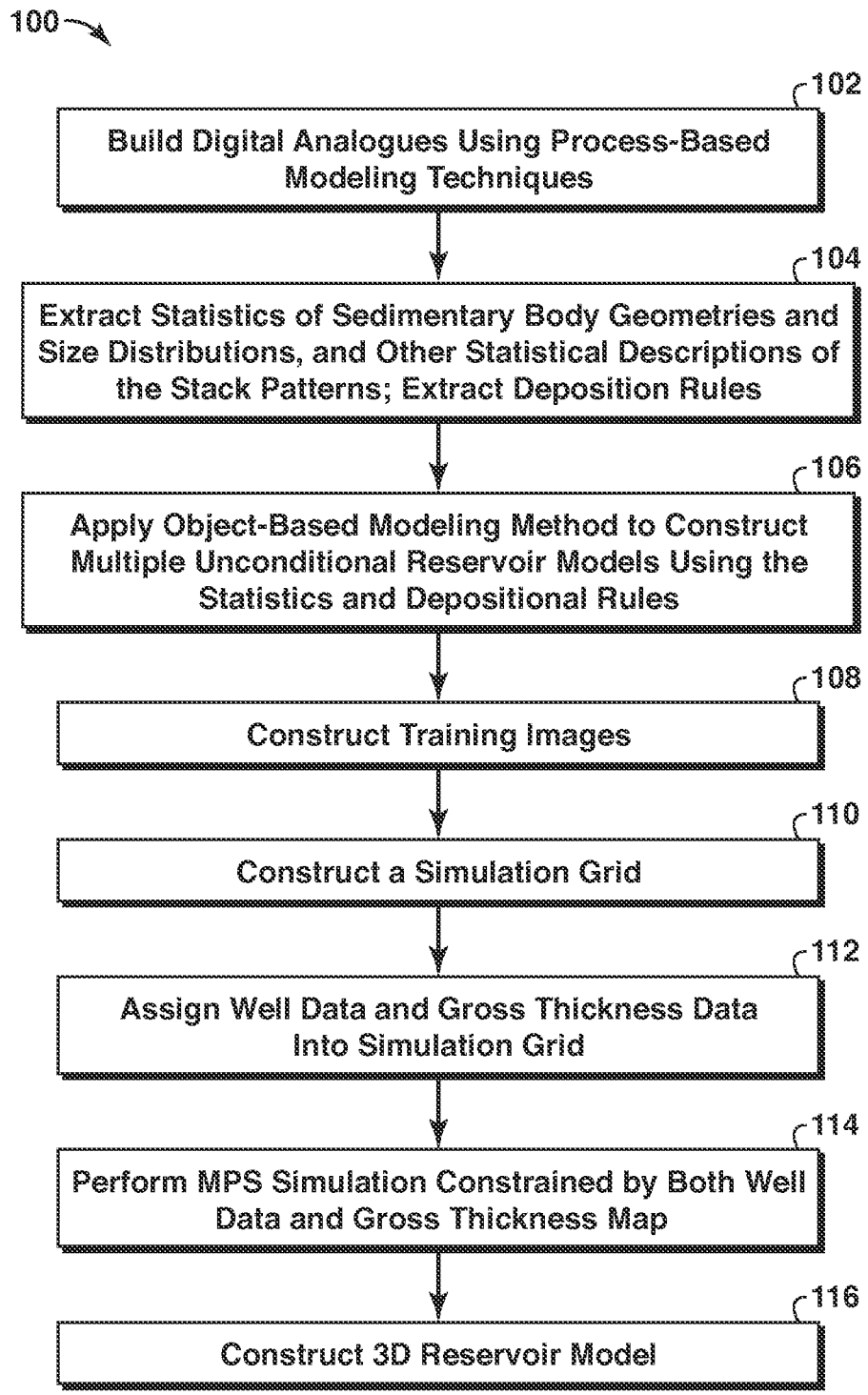
FIG. 1 is a flowchart of a method according to disclosed aspects and methodologies

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "computer component" refers to a computer-related entity, either hardware, firmware, software, a combination thereof, or software in execution. For example, a computer component can be, but is not limited to being, a process running on a processor, an object, an executable, a thread of execution, a program, a processor, and/or a computer. One or more computer components can reside within a process and/or thread of execution and a computer component can be localized on one computer and/or distributed between two or more computers.

As used herein, the terms "computer-readable medium" or "tangible machine-readable medium" refer to any tangible, storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

As used herein, "hydrocarbon" includes any hydrocarbon substance, including for example one or more of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as generating, analyzing, extracting, applying, constructing, performing, defining, grouping, assigning, finding, sampling, predicting identifying, correlating, or the like, may refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

In previous MPS simulations, only one training lobe per image is simulated at a time, thus requiring multiple sequential simulations to simulate all lobe objects being put to a reservoir model. According to aspects and techniques described herein, a method is provided that employs a MPS modeling technology to simulate all lobe objects in a single training image. FIG. 1 is a flowchart showing a method 100 according to the disclosed aspects and techniques. At block 102 a process-based model is generated that mimics the depositional process of a specific reservoir. This process-based model can be considered a digital analogue of the depositional process. At block 104 the model is analyzed to extract the statistics of the depositional or sedimentary body (such as a scour lobe) geometries and size distributions, and other statistical descriptions of the stack patterns. Depositional rules are also extracted.

Figure 2A:
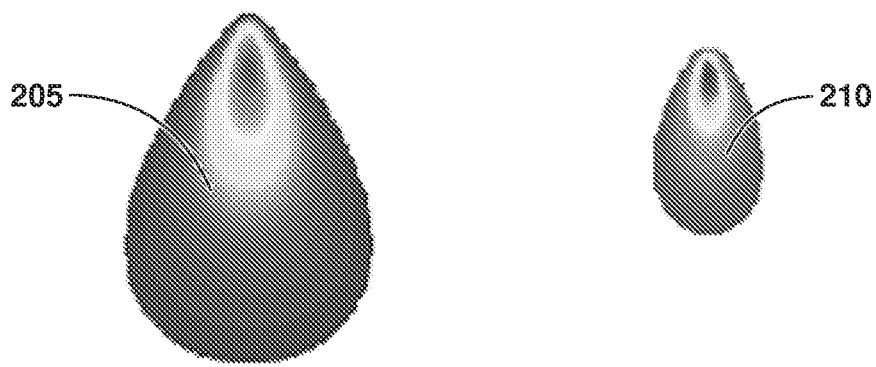
FIG. 2A is a top plan view of a depositional thickness map and an erosional thickness map according to disclosed aspects and methodologies.
Figure 2B:
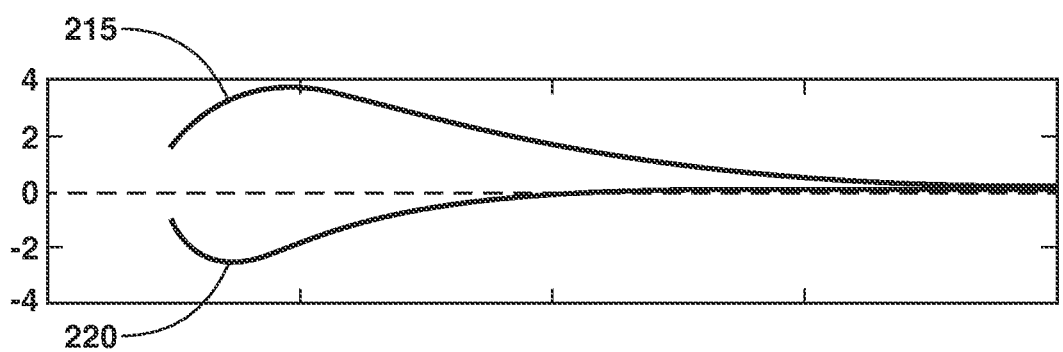
FIG. 2B is a cross-section showing contributions of the thickness maps of FIG. 2A to a scour lobe object according to disclosed aspects and methodologies.

At block 106 an object-based modeling method is applied to construct multiple unconditional geologic models using the statistics and depositional rules extracted at block 104. In other words, the results from block 104 are used to run unconditional object-based simulations to generate multiple realizations of the depositional body being simulated. The depositional body or object can be modeled as having been subject to deposition and erosion, and the thickness of the object due to both deposition and erosion can be mapped separately. FIG. 2A depicts a depositional thickness map 205 and an erosional thickness map 210 for a scour lobe object. To form a three-dimensional (3D) object body, the deposition thickness (represented by depositional thickness map 205) is added to the deposits underlying the scour lobe, and the erosion thickness (represented by erosional thickness map) is subtracted from the underlying deposits. FIG. 2B shows a cross-section profile of the scour lobe object, with lines 215 and 220 representing the contributions of depositional thickness map 205 and erosional thickness map 210, respectively. Alternatively, the object may be modeled using only one of the depositional thickness or the erosion thickness if desired. In this case, only one thickness map is formed and added to/subtracted from the underlying deposits.

Returning to FIG. 1, at block 108 a series of training images are constructed or obtained using the object-based simulation results. Included in the training images are a depositional thickness training image, an erosional thickness training image (if erosion is present in the reservoir deposition environment), and a gross thickness training image. The depositional thickness training image is obtained or constructed by sequentially stacking multiple depositional thickness realizations obtained from the unconditional object-based models in block 106. The erosional thickness training image is constructed by stacking the corresponding erosional thickness realizations in the same sequence shown in the depositional thickness training image. To obtain the gross thickness training image, first the individual object thickness realizations are converted into 3D models, letting the depositional thickness add up onto the current topography and the erosional thickness cut down underlying deposits (if erosion is present). Then the thickness is summed up vertically cell by cell for each of the 3D lobe models. The final gross thickness is the post-depositional thickness. By assigning the same gross thickness map onto the layers that belong to the same realization in block 106, a gross thickness training image is constructed.

At block 110, a 3-dimensional simulation grid is constructed. The number of cells along the x- and y-directions depends on the reservoir dimensions and the cell size chosen by the user. The number of layers in the z-direction is the same or substantially the same as the number of geologic objects being simulated in the simulation grid.

Figure 3:
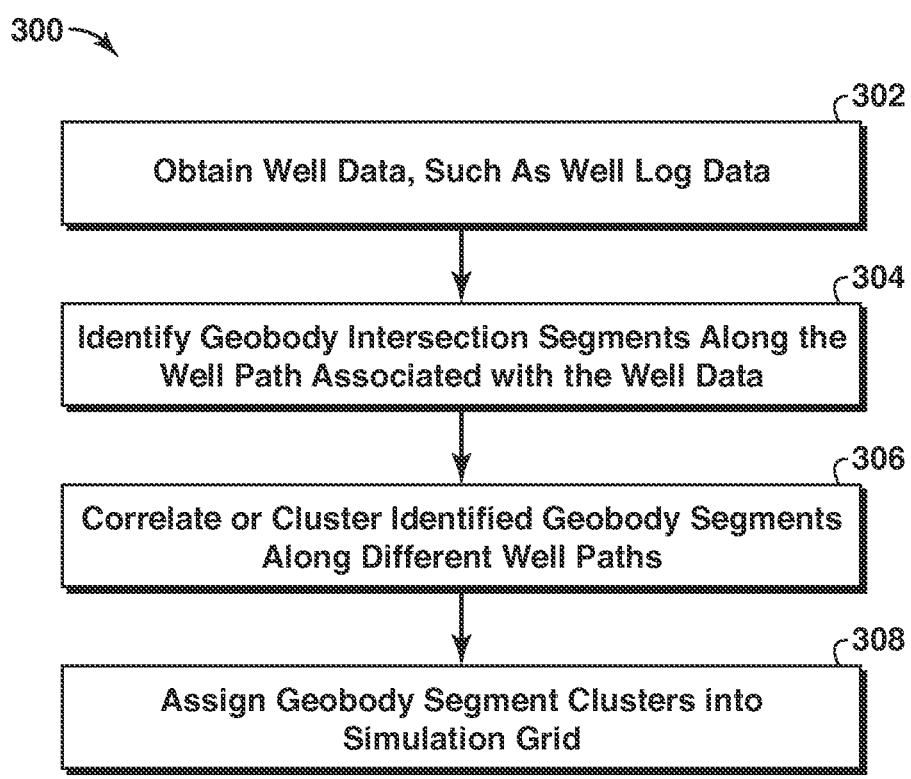
FIG. 3 is a flowchart of a method according to disclosed aspects and methodologies.
Figure 4:
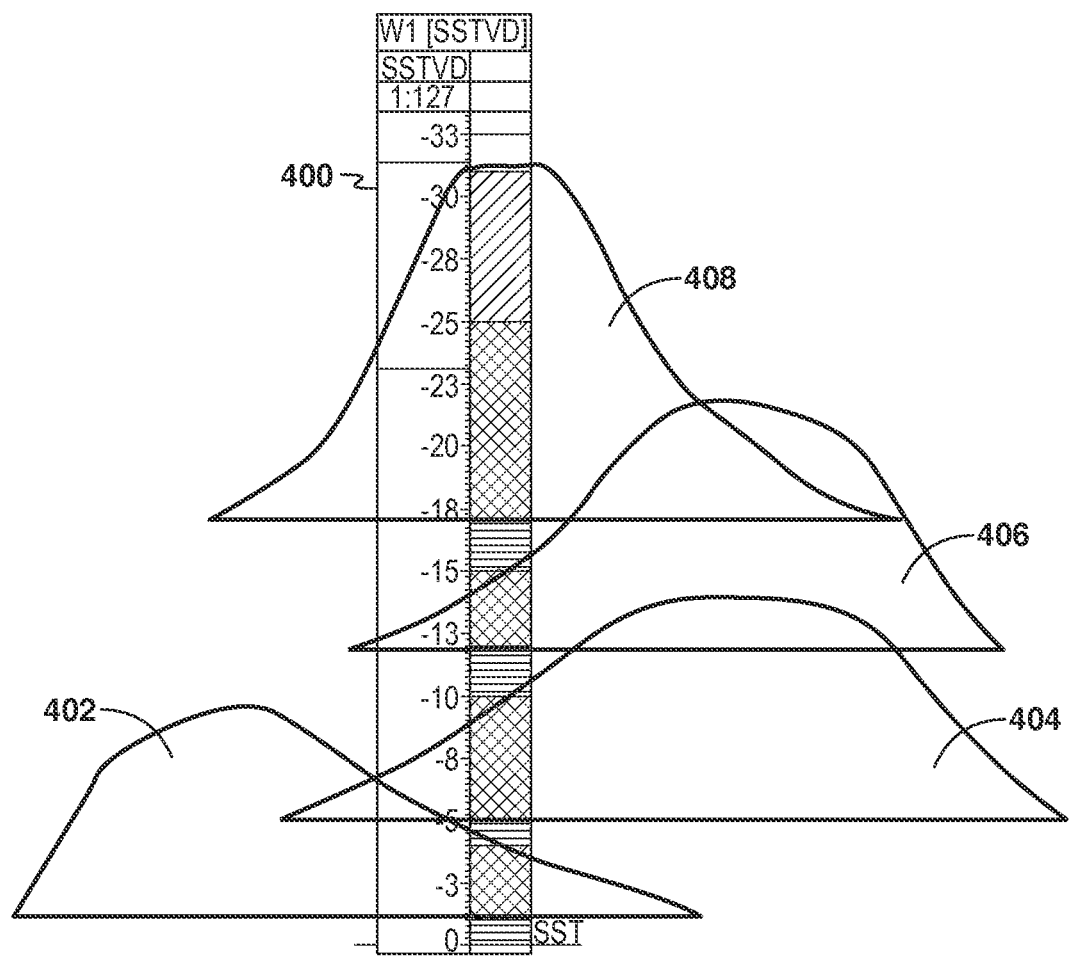
FIG. 4 is a diagram showing geobody intersection segments along a well path according to disclosed aspects and methodologies.
Figure 5:
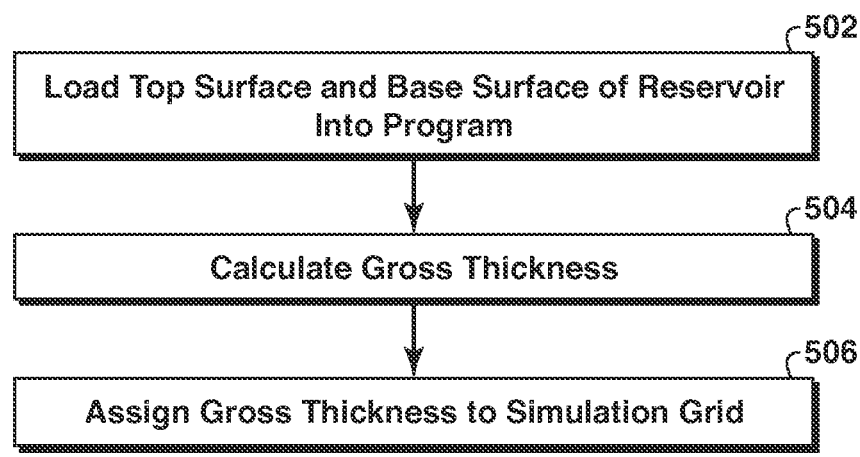
FIG. 5 is a flowchart of a method according to disclosed aspects and methodologies.

At block 112, conditional data is assigned to the simulation grid. The conditional data includes well data and gross thickness data. Preferably the well data includes well log data but may come from other sources as is known in the art. FIG. 3 is a flow chart showing a method 300 describing how the well data is preprocessed and then assigned into the simulation grid. At block 302 the well data, such as well log data, is obtained. At block 304 the geobody intersection segments along the well path associated with the well data are identified either manually or automatically based on user-input rules. FIG. 4 shows an example of the identified lobe (geobody) intersection segments 402, 404, 406, 408 along a well path 400. In this example four intersection segments are identified. Back to FIG. 3, at block 306 the identified geobody segments along different well paths are correlated or clustered either manually or automatically using an optimization process. The geobody segments that are in the same cluster are assumed to belong to the same geobody. These geobody segment clusters are then ordered from old to young. At block 308, these geobody segment clusters are assigned into the simulation grid either manually or automatically using optimization process. This assigning of geobody segment clusters may be done stochastically. Different clusters are assigned to different layers. This assignment proceeds sequentially from old cluster to young cluster until all the clustered are assigned to the simulation grid layers. FIG. 5 shows the steps of assigning gross thickness into simulation grid. At block 502, the top surface and base surface of the reservoir are imported into program. At block 504, the gross thickness is calculated using these two surfaces. The final result is a 2D map. At block 506, assign the 2D gross thickness map into 3D simulation grid such that each layer of the simulation grid has the same property as the 2D gross thickness map.

Figure 6:
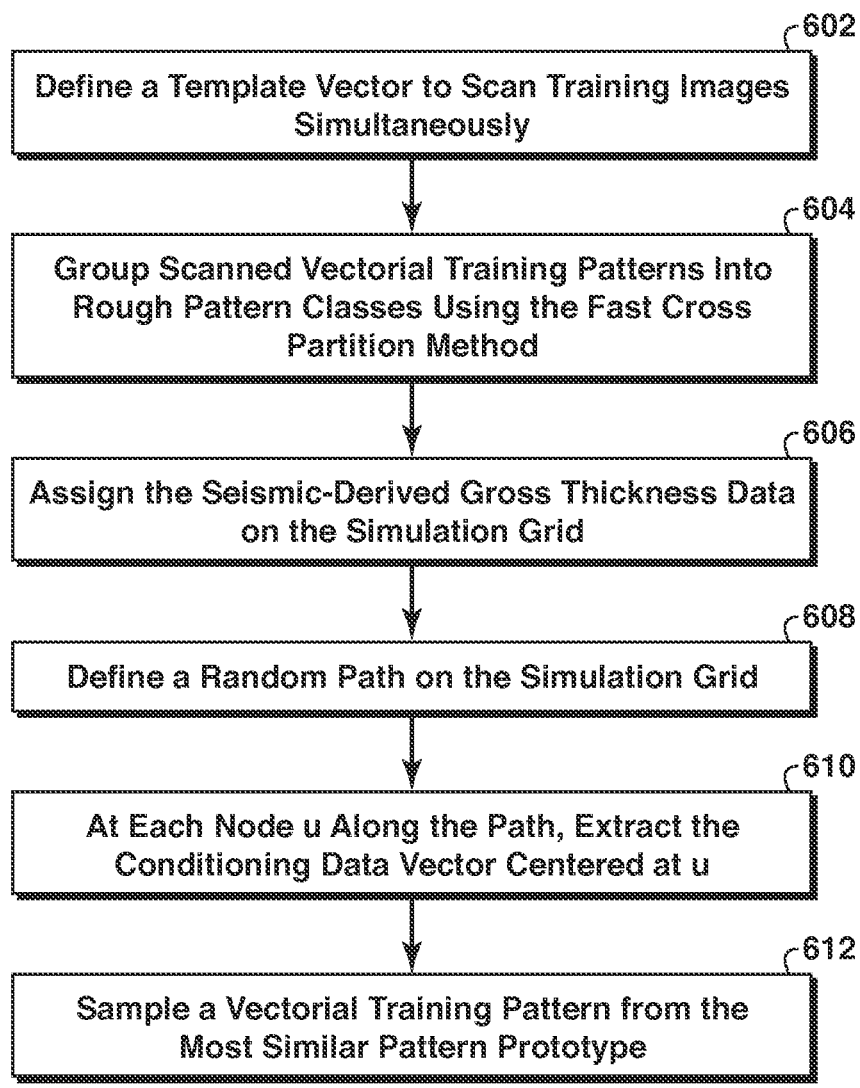
FIG. 6 is a flowchart of a method according to disclosed aspects and methodologies.

Returning to FIG. 1, at block 114 a modified conditional multiple-point geostatistical simulation (MPS) is performed using multiple training images. FIG. 6 is a flowchart showing how the modified conditional MPS 114 is performed. At block 602 a search template vector $\vec{T}$ with two or three elements is defined to scan three training images simultaneously. The elements of a three-element template vector are geologic object deposition thickness, geologic object erosion thickness and simulation grid gross thickness. The elements of a two-element template vector are simulation grid gross thickness and either geologic object erosion thickness or deposition thickness. These template elements have the same size $n_x \times n_y \times n_z$, where $n_z$ is equal to the number of objects being simulated. The sizes $n_x$ and $n_y$ are chosen by a user based on the object size. At block 604 the scanned training images, which may be thought of as vectorial training patterns $\vec{pat}$ (including deposition and/or erosion thickness and gross thickness), are grouped into rough pattern classes using the fast cross partition method, which is known in the art. These rough pattern classes are called pattern prototype $\vec{prot}$ classes, shown as $\vec{prot}_1$, $\vec{prot}_2$, through $\vec{prot}_n$ in FIG. 7. At block 606 the seismic-derived gross thickness data are assigned on the simulation grid. The number of layers in the simulation grid 700 is the same as the number of objects being simulated. Each layer has the same gross thickness map. At block 608 a random path is defined in the simulation grid. The random path may or may not be required to pass through adjacent nodes in the simulation grid. At block 610, at each node u along the random path, the conditioning data event vector $\vec{dev}$ centered at u is extracted, and the prototype $\vec{prot}$ closest to $\vec{dev(u)}$ is found using a Manhattan distance. The Manhattan distance is defined as the sum of all absolute differences between the prototype and the data event of all three elements (gross thickness, deposition thickness, and erosion thickness):

$$d\langle dev(u), prot\rangle = \sum_{a=0}^{n_T} d_a\langle \overrightarrow{dev(u+h_a)}, \overrightarrow{prot(h_a)}\rangle \text{ and } d_a\langle x_a, y_a\rangle =$$

$$\sum_{i=1}^{n_f} |dev(u+h_a, f_i) - prot(h_a, f_i)|$$

where u is the center node of the data event being compared to the prototype, $n_T$ is the total number of the nodes in the search template, $h_a$ is the node offset in the search template, $n_f$ is the number of elements in the training image vector, and f is an index for each element.

Figure 7:
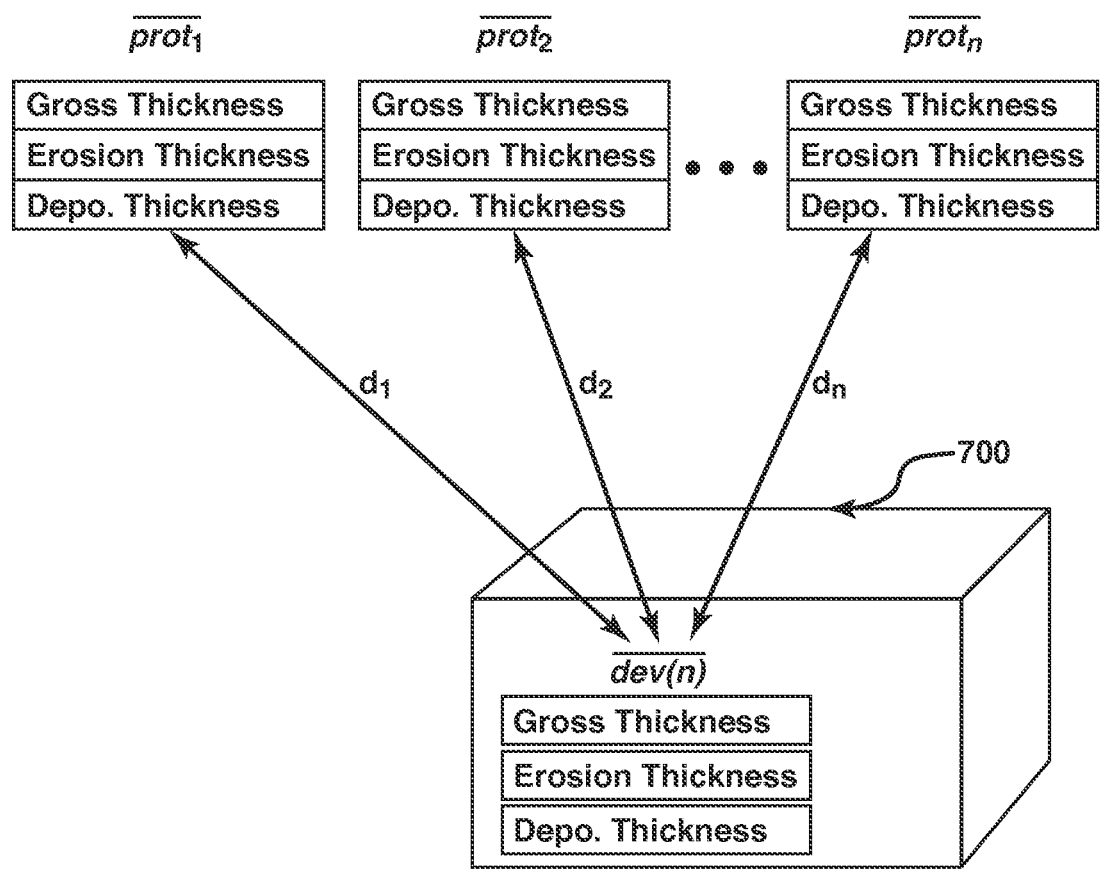
FIG. 7 is a diagram depicting pattern prototype classes and a simulation grid according to disclosed aspects and methodologies.

As shown in FIG. 7, prototype classes $\vec{prot}_1$, $\vec{prot}_2$, through $\vec{prot}_n$ are at respective distances $d_1$, $d_2$, through $d_n$ from $\vec{dev(u)}$. At block 612 a vectorial training pattern $\vec{pat}$ from the most similar (i.e., the smallest distance to the data event) pattern prototype $\vec{prot}$ is sampled and passed to the simulation grid. The simulation then proceeds to the next node until all the nodes in the simulation grid are visited. The final result is vectorial since the patterns are vectorial.

Returning to FIG. 1, a three-dimensional (3D) reservoir-model is constructed using MPS simulated realizations. The 3D model construction starts at the bottom surface of the reservoir. MPS simulated object deposition and/or erosion thickness realizations are added and/or subtracted from underlying deposits. The final 3D model displays 3D object bodies with explicitly defined boundaries. If shale drape is present along these boundaries, during model construction a thin layer is added up on top of the object top bounding surfaces, forming a complex flow barrier distribution.

The disclosed aspects and methodologies may be used for deep-water distributary reservoir modeling. In this case, little information may be available, and it may be necessary to borrow the necessary information from the physical process-based modeling result (block 102) and make use of the object-based modeling technique (block 106) to create training images for the MPS simulation (block 114). Where there is enough information from wells and other reservoir analogues, it may not be necessary to perform the portions of the method represented by blocks 102 and 104.

The MPS modeling method of block 114 can apply to any type of reservoir in which a depositional geobody can be expressed as an object, such as carbonate reservoirs which have clearly defined facies boundaries, or fluvial channel-type reservoirs where the channel has a well-defined shape.

Figure 8:
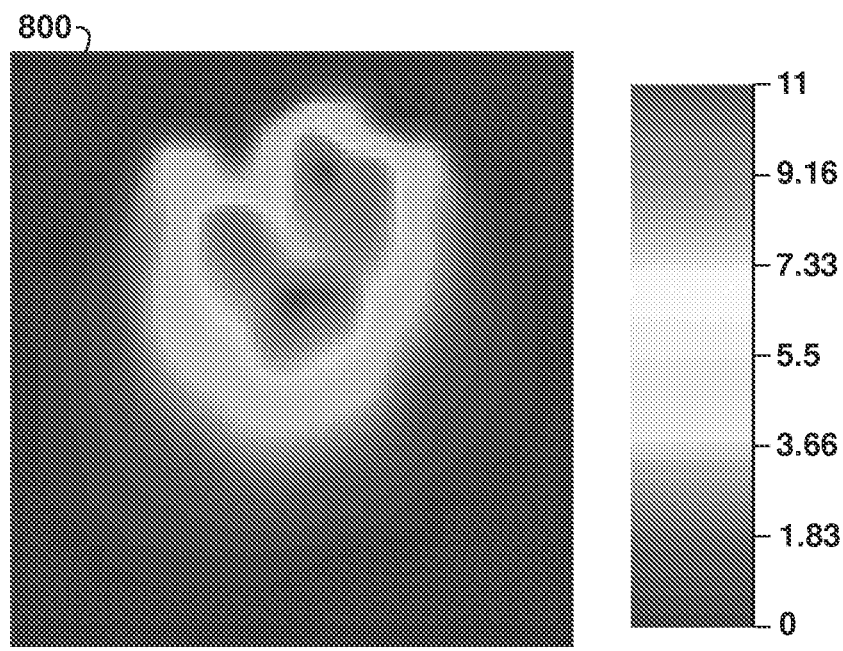
FIG. 8 is a top plan view representing gross thickness as measured from the bottom of a reservoir according to disclosed aspects and methodologies.
Figure 9:
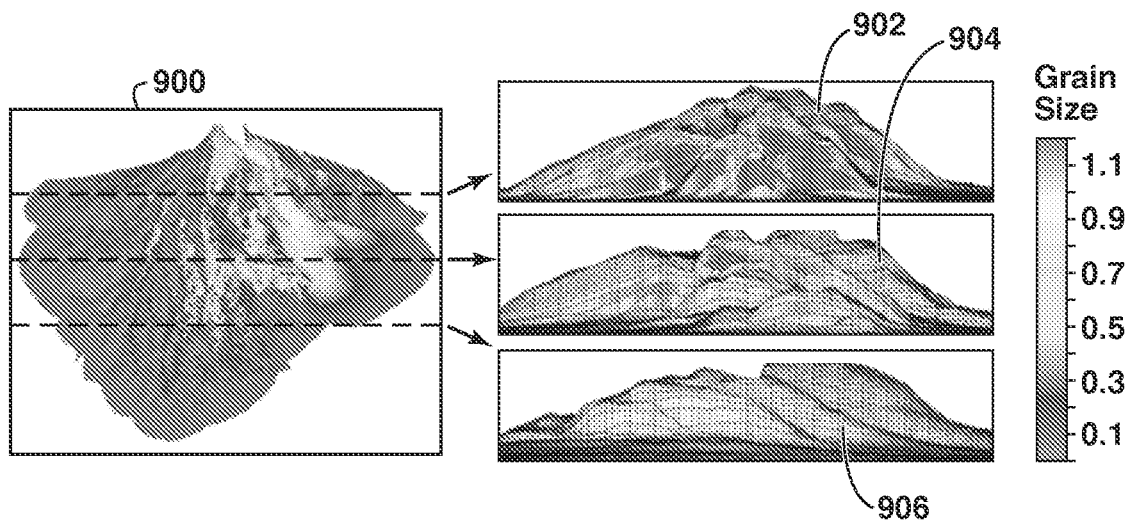
FIG. 9 is a 3-dimensional digital reservoir analogue according to disclosed aspects and methodologies.

FIGS. 8-9 show a deep-water distributary example to demonstrate the disclosed aspects and methodologies. FIG. 8 is a depiction 800 of the gross thickness as measured from the bottom of a reservoir. FIG. 9 shows a 3D digital reservoir analogue 900 built using process-based modeling techniques. Cross sections 902, 904, and 906 show the lobe object stacking pattern changes from vertical aggradation to lateral migration. In this case, the lobe object has both erosion and deposition thickness. The objective of this reservoir modeling is to simulate the lobe stacking pattern observed from FIG. 9 that is constrained by reservoir gross thickness map (FIG. 8).

Figure 10:
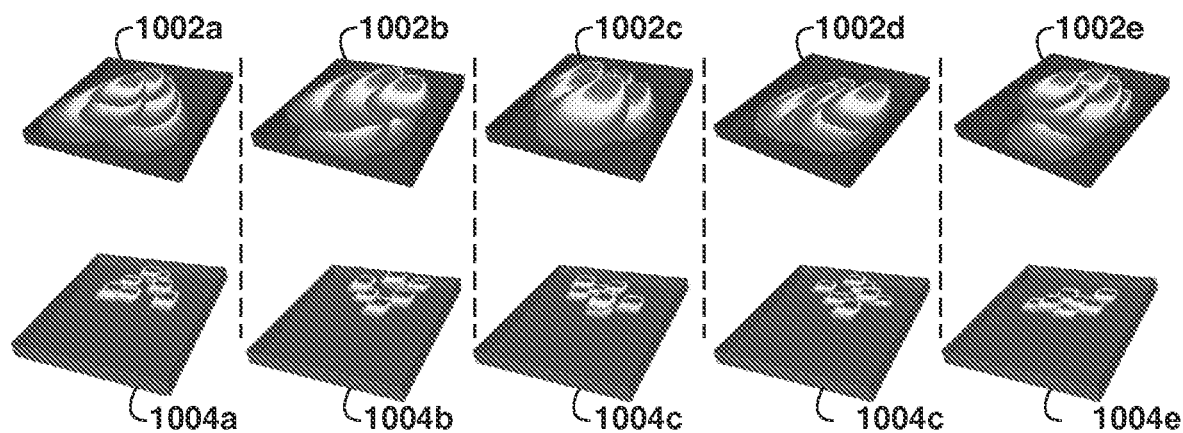
FIG. 10 is a perspective view of unconditional object-based modelling results for multiple realizations according to disclosed aspects and methodologies.
Figure 11:
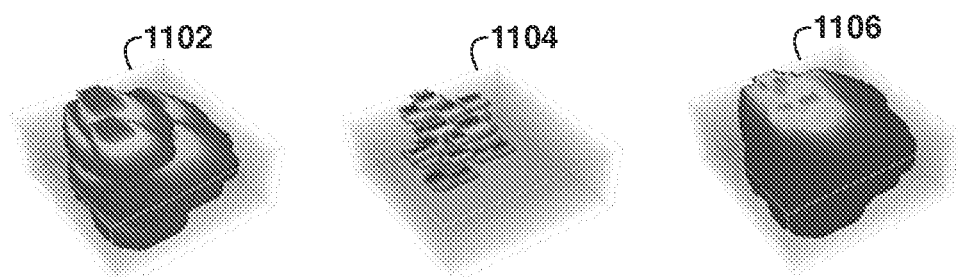
FIG. 11 is a perspective view of training images according to disclosed aspects and methodologies.
Figure 12:
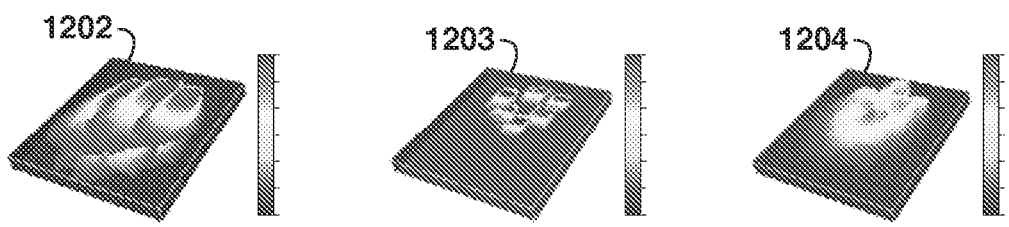
FIG. 12 is a perspective view of MPS simulated realizations according to disclosed aspects and methodologies.
Figure 13:
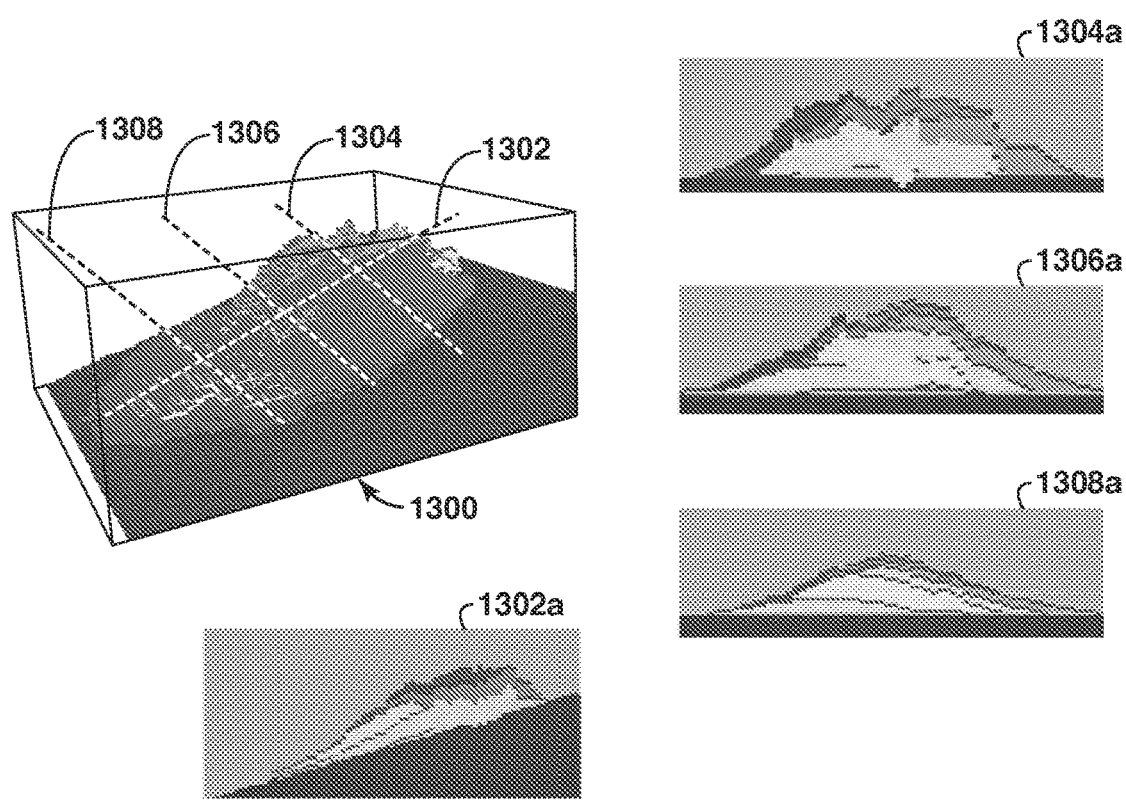
FIG. 13 is a perspective view of a 3-dimensional model and associated cross-sections according to disclosed aspects and methodologies.
Figure 14:
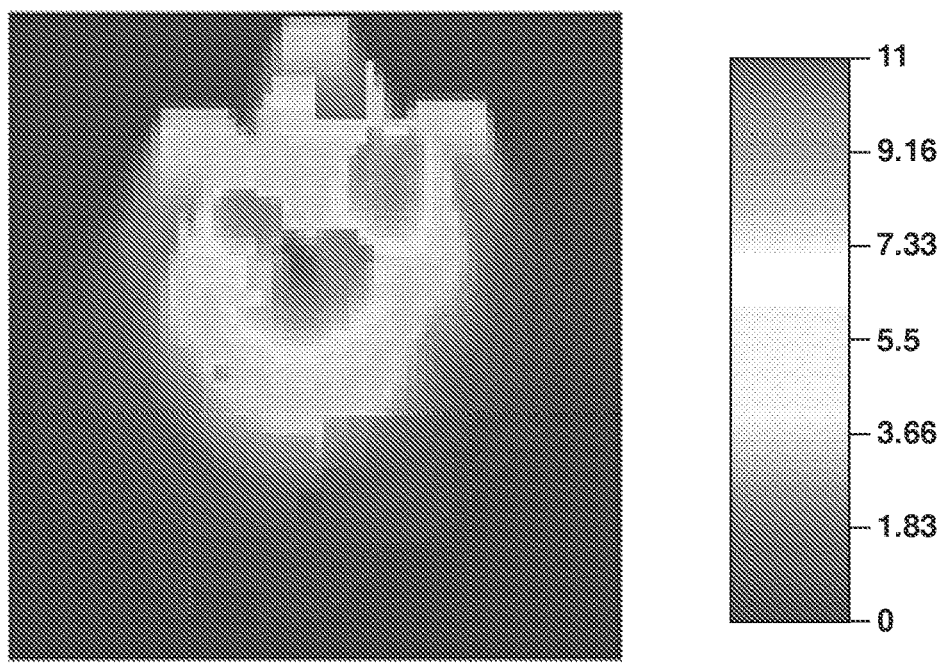
FIG. 14 is a top plan view of a gross thickness map according to disclosed aspects and methodologies.

FIGS. 10-13 show the results of applying method 100 to the example of FIGS. 8-9. The unconditional object-based modeling results for five different realizations are shown in FIG. 10. Each realization includes a depositional thickness map 1002a, 1002b, 1002c, 1002d, 1002e and an erosional thickness map 1004a, 1004b, 1004c, 1004d, 1004e. FIG. 11 shows training images constructed according to block 108 of method 100. The training images include a depositional thickness training image 1102, an erosional thickness training image 1104, and a gross thickness training image 1106, which as previously explained is a combination of the depositional thickness training image and the erosional thickness training image. FIG. 12 depicts the MPS simulated realizations performed according to block 114 of FIGS. 1 and 3. The MPS simulated realizations include a depositional thickness map 1202, an erosional thickness map 1204, and a gross thickness map 1206. FIG. 13 shows a 3D model 1300 constructed using the MPS simulated deposition thickness map 1202 and erosion thickness map 1204 according to block 116 in FIG. 1 and/or block 612 in FIG. 6. Lines 1302, 1304, 1306, and 1308 are cross-section lines that correspond to model cross-sections 1302a, 1304a, 1306a, and 1308a, respectively. These cross-sections show similar stacking patterns to the cross-sections 902, 904, and 906. FIG. 14, which is a depiction 1400 of the gross thickness of the simulated model, compares favorably to the gross thickness depicted in FIG. 8.

Figure 15:
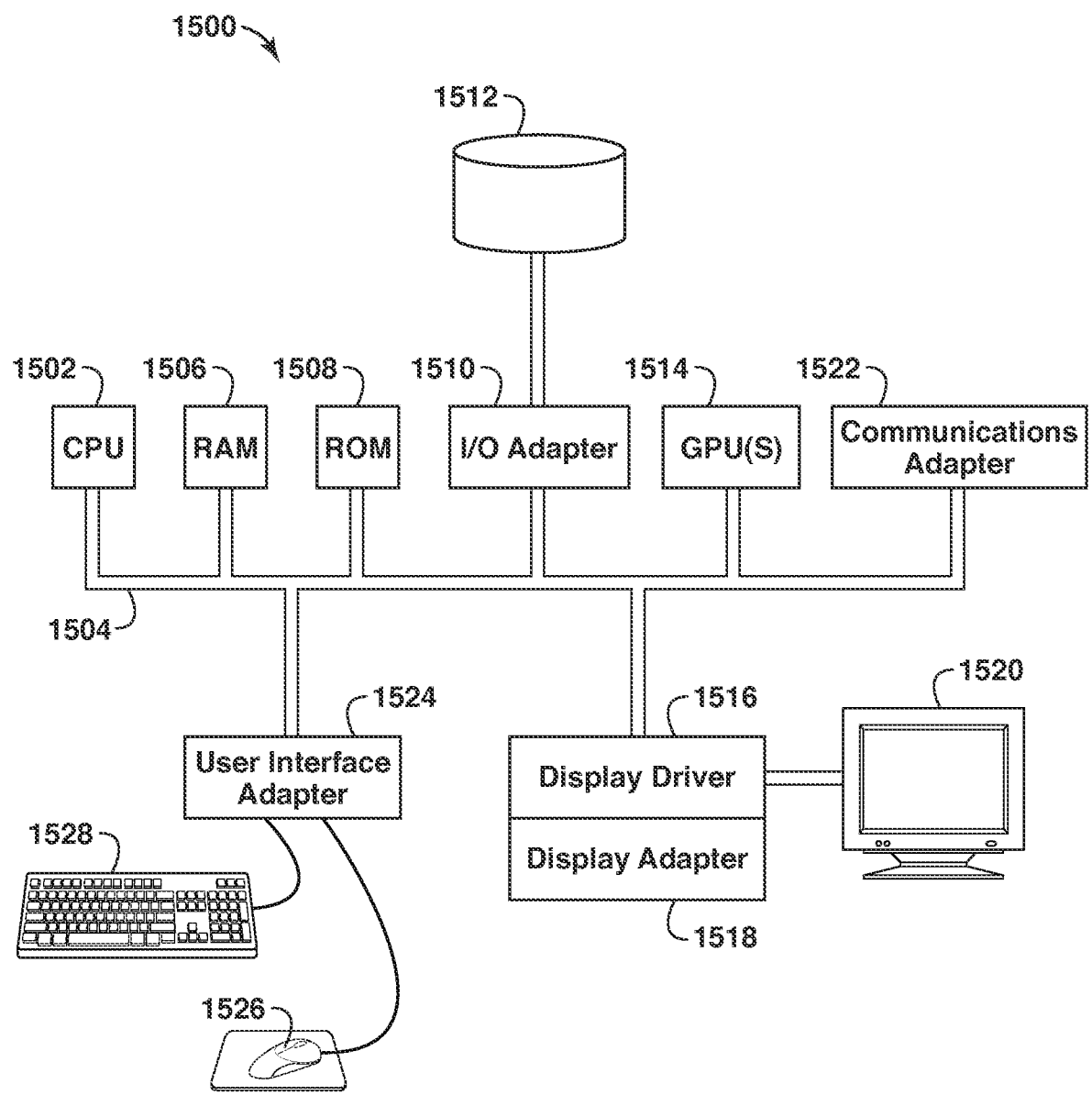
FIG. 15 is a block diagram of a computing system used to perform disclosed aspects and methodologies.

FIG. 15 is a block diagram of a computer system 1500 that may be used to perform any of the methods disclosed herein. A central processing unit (CPU) 1502 is coupled to system bus 1504. The CPU 1502 may be any general-purpose CPU, although other types of architectures of CPU 1502 (or other components of exemplary system 1500) may be used as long as CPU 1502 (and other components of system 1500) supports the inventive operations as described herein. The CPU 1502 may execute the various logical instructions according to disclosed aspects and methodologies. For example, the CPU 1502 may execute machine-level instructions for performing processing according to aspects and methodologies disclosed herein.

The computer system 1500 may also include computer components such as a random access memory (RAM) 1506, which may be SRAM, DRAM, SDRAM, or the like. The computer system 1500 may also include read-only memory (ROM) 1508, which may be PROM, EPROM, EEPROM, or the like. RAM 1506 and ROM 1508 hold user and system data and programs, as is known in the art. The computer system 1500 may also include an input/output (I/O) adapter 1510, a communications adapter 1522, a user interface adapter 1524, and a display adapter 1518. The I/O adapter 1510, the user interface adapter 1524, and/or communications adapter 1522 may, in certain aspects and techniques, enable a user to interact with computer system 1500 in order to input information.

The I/O adapter 1510 preferably connects a storage device(s) 1512, such as one or more of hard drive, compact disc (CD) drive, floppy disk drive, tape drive, etc. to computer system 1500. The storage device(s) may be used when RAM 1506 is insufficient for the memory requirements associated with storing data for operations of embodiments of the present techniques. The data storage of the computer system 1500 may be used for storing information and/or other data used or generated as disclosed herein. The communications adapter 1522 may couple the computer system 1500 to a network (not shown), which may enable information to be input to and/or output from system 1500 via the network (for example, the Internet or other wide-area network, a local-area network, a public or private switched telephony network, a wireless network, any combination of the foregoing). User interface adapter 1524 couples user input devices, such as a keyboard 1528, a pointing device 1526, and the like, to computer system 1500. The display adapter 1518 is driven by the CPU 1502 to control, through a display driver 1516, the display on a display device 1520. Information and/or representations of one or more 2D canvases and one or more 3D windows may be displayed, according to disclosed aspects and methodologies.

The architecture of system 1500 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

Figure 16:
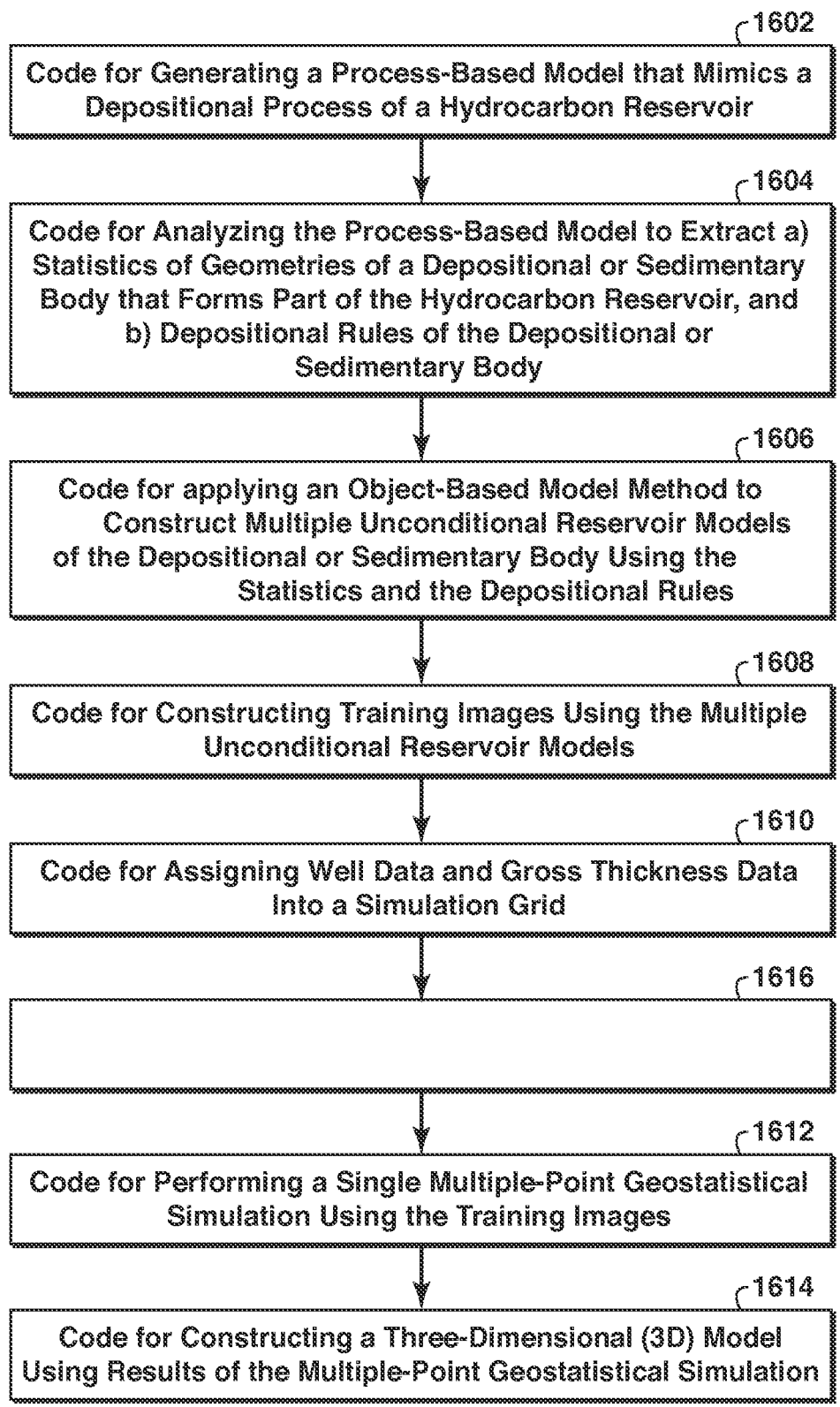
FIG. 16 is a block diagram representing computer code according to disclosed methodologies and techniques.

FIG. 16 shows a representation of machine-readable logic or code 1600 for simulating a hydrocarbon reservoir. Code 1600 may be used or executed with a computing system such as computing system 1500. At block 1602 code is provided for generating a process-based model that mimics a depositional process of the hydrocarbon reservoir. At block 1604 code is provided for analyzing the process-based model to extract a) statistics of geometries of a depositional or sedimentary body that forms part of the hydrocarbon reservoir, and b) depositional rules of the depositional or sedimentary body. At block 1606 code is provided for applying an object-based modeling method to construct multiple unconditional geologic models of the depositional or sedimentary body using the statistics and the depositional rules. At block 1608 code is provided for constructing training images using the multiple unconditional geologic models. At block 1610 code is provided for assigning well data and gross thickness data into a simulation grid. At block 1612 code is provided for performing a single multiple-point geostatistical simulation using the training images. At block 1614 code is provided for constructing a three-dimensional (3D) model using results of the multiple-point geostatistical simulation. Code effectuating or executing other features of the disclosed aspects and methodologies may be provided as well. This additional code is represented in FIG. 16 as block 1616, and may be placed at any location within code 1600 according to computer code programming techniques.

Figure 17:
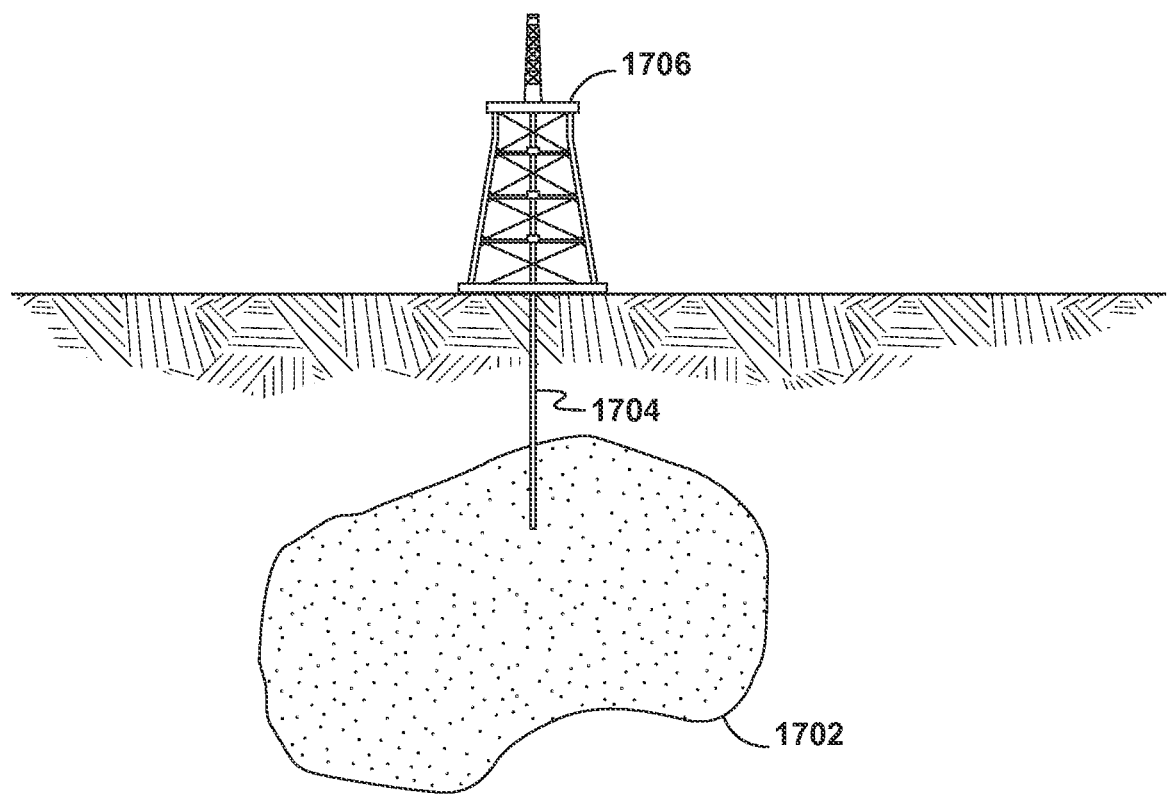
FIG. 17 is a side elevational view of a hydrocarbon reservoir.
Figure 18:
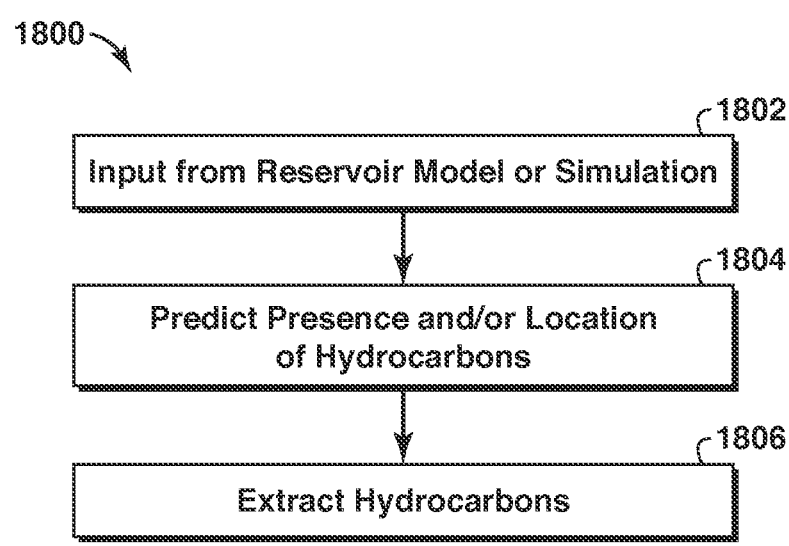
FIG. 18 is a flowchart of a method according to disclosed methodologies and techniques.

Aspects disclosed herein may be used to perform hydrocarbon management activities such as extracting hydrocarbons from a subsurface formation, region, or reservoir, which is indicated by reference number 1702 in FIG. 17. A method 1800 of extracting hydrocarbons from subsurface reservoir 1702 is shown in FIG. 18. At block 1802 inputs are received from a numerical model, geologic model, or flow simulation of the subsurface region, where the model or simulation has been run or improved using the methods and aspects disclosed herein. At block 1804 the presence and/or location of hydrocarbons in the subsurface region is predicted. At block 1806 hydrocarbon extraction is conducted to remove hydrocarbons from the subsurface region, which may be accomplished by drilling a well 1704 using oil drilling equipment 1706 (FIG. 17). Other hydrocarbon management activities may be performed according to known principles.

Illustrative, non-exclusive examples of methods and products according to the present disclosure are presented in the following non-enumerated paragraphs. It is within the scope of the present disclosure that an individual step of a method recited herein, including in the following enumerated paragraphs, may additionally or alternatively be referred to as a "step for" performing the recited action.

A. A method of simulating a hydrocarbon reservoir, comprising:
generating a process-based model that mimics a depositional process of the hydrocarbon reservoir;
analyzing the process-based model to extract
statistics of geometries of a depositional or sedimentary body that forms part of the hydrocarbon reservoir, and
depositional rules of the depositional or sedimentary body;
applying an object-based modeling method to construct multiple unconditional geologic models of the depositional or sedimentary body using the statistics and the depositional rules;
constructing training images using the multiple unconditional geologic models;
assigning well data and gross thickness data into a simulation grid;
performing a single multiple-point geostatistical simulation using the training images; and
constructing a three-dimensional (3D) reservoir model using results of the multiple-point geostatistical simulation.

A1. The method according to paragraph A, wherein performing the multiple-point geostatistical simulation comprises:
defining a template vector to scan training images simultaneously;
defining the scanned training images as vectorial training patterns;
grouping the vectorial training patterns into pattern prototype classes;
assigning seismic-derived gross thickness data on a simulation grid, the simulation grid having a plurality of nodes;
defining a random path on the simulation grid;
for each node along the random path, extracting a conditioning data event vector centered at said node, and finding a pattern prototype class closest to the conditioning data event vector; and
sampling a vectorial training pattern from the closest pattern prototype class.

A2. The method according to paragraph A1, wherein the template vector is a two-element vector with a first element being gross thickness and a second element being one of deposition thickness and erosion thickness.

A3. The method according to paragraph A-A1, wherein the template vector is a three-element vector with a first element being gross thickness, a second element being deposition thickness, and a third element being erosion thickness.

A4. The method according to any of paragraphs A1-A3, wherein the scanned training images are grouped into pattern prototype classes using a fast cross partitioning.

A5. The method according to any of paragraphs A1-A4, wherein the simulation grid has a number of layers equal to a number of objects being simulated.

A6. The method according to any of paragraphs A1-A5, wherein finding the pattern prototype class closest to the conditioning data event vector is accomplished using a Manhattan distance.

A7. The method according to paragraph A6, wherein the Manhattan distance is defined as $$d\langle dev(u), prot\rangle = \sum_{a=0}^{n_T} d_a\langle \overrightarrow{dev(u+h_a)}, \overrightarrow{prot(h_a)}\rangle \text{ and } d_a\langle x_a, y_a\rangle = \sum_{i=1}^{n_f} |dev(u+h_a, f_i) - prot(h_a, f_i)|$$

where
u is a center node of the data event being compared to the prototype,
$n_T$ is the total number of nodes in the search template,
$h_a$ is the node offset in the search template,
$n_f$ is the number of elements in the training image vector, and
f is an index for each element.

A8. The method according to any of paragraphs A-A7, further comprising:
predicting at least one of a presence, location, and amount of hydrocarbons in the subsurface formation; and
managing hydrocarbons in the subsurface formation based on said prediction.

A9. The method according to any of paragraphs A-A8, wherein assigning well data and gross thickness data into a simulation grid comprises:
obtaining well data;
identifying geobody intersection segments along the well path associated with the well data;
correlating or clustering identified geobody segments along different well paths; and
assigning the correlated or clustered geobody segments into the simulation grid.

A10. The method according to any of paragraphs A-A9, wherein at least one step of the method is performed using a computer.

B. A method of simulating a hydrocarbon reservoir, comprising:
applying an object-based modeling method to construct multiple unconditional geologic models of a depositional or sedimentary body in the hydrocarbon reservoir using statistics and depositional rules governing a depositional process in the hydrocarbon reservoir;
constructing training images using the multiple unconditional geologic models; performing a single multiple-point geostatistical simulation using the training images; and constructing a three-dimensional (3D) reservoir model using results of the multiple-point geostatistical simulation.

B1. The method according to paragraph B, wherein performing the multiple-point geostatistical simulation comprises:

defining a template vector to scan training images simultaneously;

defining the scanned training images as vectorial training patterns;

grouping the vectorial training patterns into pattern prototype classes;

assigning seismic-derived gross thickness data on a simulation grid, the simulation grid having a plurality of nodes;

defining a random path on the simulation grid;

for each node along the random path, extracting a conditioning data event vector centered at said node, and finding a pattern prototype class closest to the conditioning data event vector; and sampling a vectorial training pattern from the closest pattern prototype class.

B2. The method according to any of paragraph B1, wherein finding the pattern prototype class closest to the conditioning data event vector is accomplished using a Manhattan distance, wherein the Manhattan distance is defined as $$d\langle dev(u), prot\rangle = \sum_{a=0}^{n_T} d_a\langle \overrightarrow{dev(u+h_a)}, \overrightarrow{prot(h_a)}\rangle \text{ and } d_a\langle x_a, y_a\rangle = \sum_{i=1}^{n_f} |dev(u+h_a, f_i) - prot(h_a, f_i)|$$

where
 u is a center node of the data event being compared to the prototype,
 $n_T$ is the total number of nodes in the search template,
 $h_a$ is the node offset in the search template,
 $n_f$ is the number of elements in the training image vector, and
 f is an index for each element.

B3. The method according to any of paragraphs B-B2, further comprising:

predicting at least one of a presence, location, and amount of hydrocarbons in the subsurface formation; and managing hydrocarbons in the subsurface formation based on said prediction.

B4. The method according to any of paragraphs B-B3, wherein at least one step of the method is performed using a computer.

C. A system for simulating a hydrocarbon reservoir, the system comprising:

a processor;

a tangible, machine-readable storage medium that stores machine-readable instructions for execution by the processor, wherein the machine-readable instructions include code for generating a process-based model that mimics a depositional process of the hydrocarbon reservoir, code for analyzing the process-based model to extract statistics of geometries of a depositional or sedimentary body that forms part of the hydrocarbon reservoir, and depositional rules of the depositional or sedimentary body, code for applying an object-based modeling method to construct multiple unconditional geologic models of the depositional or sedimentary body using the statistics and the depositional rules, code for constructing training images using the multiple unconditional geologic models, code for assigning well data and gross thickness data into a simulation grid, code for performing a single multiple-point geostatistical simulation using the training images, and code for constructing a three-dimensional (3D) model using results of the multiple-point geostatistical simulation.

D. A computer program product having computer executable logic recorded on a tangible, machine readable medium, the computer program product when executed simulates a hydrocarbon reservoir, the computer program product comprising:

code for generating a process-based model that mimics a depositional process of the hydrocarbon reservoir, code for analyzing the process-based model to extract statistics of geometries of a depositional or sedimentary body that forms part of the hydrocarbon reservoir, and depositional rules of the depositional or sedimentary body, code for applying an object-based modeling method to construct multiple unconditional geologic models of the depositional or sedimentary body using the statistics and the depositional rules, code for constructing training images using the multiple unconditional geologic models, code for assigning well data and gross thickness data into a simulation grid, code for performing a single multiple-point geostatistical simulation using the training images, and code for constructing a three-dimensional (3D) model using results of the multiple-point geostatistical simulation.

E. A method of producing hydrocarbons from a hydrocarbon reservoir, comprising:

generating a process-based model that mimics a depositional process of the hydrocarbon reservoir;

analyzing the process-based model to extract
 statistics of geometries of a depositional or sedimentary body that forms part of the hydrocarbon reservoir, and
 depositional rules of the depositional or sedimentary body;

applying an object-based modeling method to construct multiple unconditional geologic models of the depositional or sedimentary body using the statistics and the depositional rules;

constructing training images using the multiple unconditional geologic models;

assigning well data and gross thickness data into a simulation grid;

performing a single multiple-point geostatistical simulation using the training images;

constructing a three-dimensional (3D) reservoir model using results of the multiple-point geostatistical simulation; and producing hydrocarbons from the subsurface hydrocarbon reservoir using the three-dimensional reservoir model.

BIBLIOGRAPHY

Pyrcz, M. J., et al., 2005, Stochastic Surface-Based Modeling of Turbidite Lobes, AAAPG Bulletin, V. 89, No. 2, pp. 177-191.

Michael, H, et al., 2009, Combining geologic-process models and geostatistics for conditional simulation of 3-D subsurface heterogeneity, submitted to Water Resources Research, 2009.

What is claimed is:

1. A method for simulating a hydrocarbon reservoir comprising:
generating, with a computer, a process-based model that mimics a depositional process of a hydrocarbon reservoir;
analyzing, with the computer, the process-based model to extract statistics of geometries of a depositional or sedimentary body that forms part of the hydrocarbon reservoir, and depositional rules of the depositional or sedimentary body;
applying, with the computer, an object-based modeling method to construct multiple geological models of the depositional or sedimentary body using the statistics and the depositional rules, wherein the multiple geologic models are not conditioned to subsurface data;
constructing, with the computer, training images using the unconditioned multiple geological models;
assigning, with the computer, conditioning data to a simulation grid, wherein the conditioning data comprises well data and gross thickness data;
performing, with the computer, a single multiple-point geostatistical simulation using the training images, wherein the multiple-point geostatistical simulation comprises:
defining a template vector to scan training images simultaneously;
defining the scanned training images as vectorial training patterns;
grouping the vectorial training patterns into pattern prototype classes;
assigning seismic-derived gross thickness data on a simulation grid, where the simulation grid has a plurality of nodes;
defining a random path on the simulation grid;
for each node along the random path, extracting a conditioning data event vector centered at said node and finding a pattern prototype class closest to the conditioning data event vector using a Manhattan distance, wherein the Manhattan distance is defined as:

$$d\langle dev(u), prot\rangle = \sum_{a=0}^{n_T} d_a \langle \overrightarrow{dev(u+h_a)}, \overrightarrow{prot(h_a)} \rangle \text{ and } d_a\langle x_a, y_a\rangle =$$

$$\sum_{i=1}^{n_f} |dev(u+h_a, f_i) - prot(h_a, f_i)|$$

where
u is a center node of the data event being compared to the prototype,
$n_T$ is the total number of nodes in the search template,
$h_a$ is the node offset in the search template,
$n_f$ is the number of elements in the training image vector, and
f is an index for each element; and
sampling a vectorial training pattern from the closest pattern prototype class; and
constructing, with the computer, a three-dimensional (3D) reservoir model of the hydrocarbon reservoir using results of the multiple-point geostatistical simulation, wherein the three-dimensional (3D) reservoir model displays three-dimensional object bodies in the reservoir with defined boundaries.

2. The method of claim 1, wherein the template vector is a two-element vector with a first element being gross thickness and a second element being one of deposition thickness and erosion thickness, or the template vector is a three-element vector with a first element being gross thickness, a second element being deposition thickness, and a third element being erosion thickness.

3. The method of claim 1, wherein the simulation grid has a number of layers equal to a number of objects being simulated.

4. The method of claim 1, wherein assigning well data and gross thickness data into a simulation grid comprises:
obtaining well data;
identifying geobody intersection segments along the well path associated with the well data;
correlating or clustering identified geobody segments along different well paths; and
assigning the correlated or clustered geobody segments into the simulation grid.

5. The method of claim 1, wherein stacking patterns are used to generate the process-based model.

6. The method of claim 1, wherein constructing the three-dimensional model of the hydrocarbon reservoir comprises adding depositions from the multiple-point geostatistical simulation from underlying deposits.

7. The method of claim 1, wherein constructing the three-dimensional model of the hydrocarbon reservoir comprises subtracting erosions from the multiple-point geostatistical simulation from underlying deposits.

8. A non-transitory computer readable storage medium encoded with instructions, which, when executed by a computer, causes the computer to execute the method of claim 1.

9. A system for simulating a hydrocarbon reservoir, the system comprising:
a processor;
a tangible, machine-readable storage medium that stores machine-readable instructions for execution by the processor, wherein the machine-readable instructions include code for generating a process-based model that mimics a depositional process of the hydrocarbon reservoir,
code for analyzing the process-based model to extract statistics of geometries of a depositional or sedimentary body that forms part of the hydrocarbon reservoir, and depositional rules of the depositional or sedimentary body,
code for applying an object-based modeling method to construct multiple geologic models of the depositional or sedimentary body using the statistics and the depositional rules, wherein the multiple geologic models are not conditioned to subsurface data,
code for constructing training images using the unconditioned multiple geologic models,
code for assigning conditioning data to a simulation grid, wherein the conditioning data comprises well data and gross thickness data,
code for performing a single multiple-point geostatistical simulation using the training images, wherein the multiple-point geostatistical simulation comprises:
defining a template vector to scan training images simultaneously;
defining the scanned training images as vectorial training patterns;

grouping the vectorial training patterns into pattern prototype classes;
assigning seismic-derived gross thickness data on a simulation grid, where the simulation grid has a plurality of nodes;
defining a random path on the simulation grid;
for each node along the random path, extracting a conditioning data event vector centered at said node and finding a pattern prototype class closest to the conditioning data event vector using a Manhattan distance, wherein the Manhattan distance is defined as $$d\langle dev(u), prot\rangle = \sum_{a=0}^{n_T} d_a \langle \overrightarrow{dev(u+h_a)}, \overrightarrow{prot(h_a)} \rangle \text{ and } d_a\langle x_a, y_a \rangle =$$

$$\sum_{i=1}^{n_f} |dev(u+h_a, f_i) - prot(h_a, f_i)|$$

where
u is a center node of the data event being compared to the prototype,
$n_T$ is the total number of nodes in the search template,
$h_a$ is the node offset in the search template,
$n_f$ is the number of elements in the training image vector, and
f is an index for each element; and
sampling a vectorial training pattern from the closest pattern prototype class, and
code for constructing a three-dimensional (3D) model using results of the multiple-point geostatistical simulation, wherein the three-dimensional (3D) reservoir model displays three-dimensional object bodies in the reservoir with defined boundaries.

10. A method for modeling a hydrocarbon reservoir comprising:
generating a deposition model that models a depositional process of a hydrocarbon reservoir;
analyzing the deposition model to extract statistics of geometries and size distributions of depositional or sedimentary bodies in the hydrocarbon reservoir and to extract depositional rules of the hydrocarbon reservoir;
constructing multiple geological models of at least one depositional or sedimentary body in the hydrocarbon reservoir using the extracted statistics and depositional rules, wherein the multiple geologic models are not conditioned to subsurface data;
constructing a series of training images using the unconditioned multiple geological models;
assigning conditioning data to a simulation grid, wherein the simulation grid has a plurality of nodes and wherein the conditioning data comprises well data and seismic data;
performing a multiple-point geostatistical simulation using the series of training images, wherein the multiple-point geostatistical simulation comprises:
defining a template vector to simultaneously scan the series of training images;
defining the scanned training images as vectorial training patterns;
grouping the vectorial training patterns into pattern prototype classes;
defining a random path on the simulation grid;
for each node of the simulation grid that is along the random path, extracting a conditioning data event vector centered at said node and finding a pattern prototype class closest to the conditioning data event vector using a Manhattan distance, wherein the Manhattan distance is defined as $$d\langle dev(u), prot\rangle = \sum_{a=0}^{n_T} d_a \langle \overrightarrow{dev(u+h_a)}, \overrightarrow{prot(h_a)} \rangle$$

and $$d_a\langle x_a, y_a\rangle = \sum_{i=1}^{n_f} |dev(u+h_a, f_i) - prot(h_a, f_i)|$$

where
u is a center node of the data event being compared to the prototype,
$n_T$ is the total number of nodes in the search template,
$h_a$ is the node offset in the search template,
$n_f$ is the number of elements in the training image vector, and
f is an index for each element; and
sampling a vectorial training pattern from the closest pattern prototype class; and
constructing a three-dimensional (3D) model of the hydrocarbon reservoir using the results of the multiple-point geostatistical simulation, wherein the three-dimensional (3D) reservoir model displays three-dimensional object bodies in the reservoir with defined boundaries.

11. The method of claim 10, wherein the depositional process is a stacking pattern.

* * * * *